United States Patent
Butz

(10) Patent No.: US 12,485,812 B1
(45) Date of Patent: Dec. 2, 2025

(54) LOG LIFT TRANSPORTER

(71) Applicant: Douglas C. Butz, Chambersburg, PA (US)

(72) Inventor: Douglas C. Butz, Chambersburg, PA (US)

( * ) Notice: Subject to any disclaimer, the term of this patent is extended or adjusted under 35 U.S.C. 154(b) by 421 days.

(21) Appl. No.: 18/081,279

(22) Filed: Dec. 14, 2022

Related U.S. Application Data

(60) Provisional application No. 63/289,220, filed on Dec. 14, 2021.

(51) Int. Cl.
*B60P 3/41* (2006.01)
*B66F 9/075* (2006.01)

(52) U.S. Cl.
CPC ............ *B60P 3/41* (2013.01); *B66F 9/07504* (2013.01)

(58) Field of Classification Search
CPC ....... A01G 23/006; A01G 23/003; B60P 3/41; B66C 1/585
USPC .................................................. 414/460, 23
See application file for complete search history.

(56) References Cited

U.S. PATENT DOCUMENTS

| | | | | |
|---|---|---|---|---|
| 891,385 A * | 6/1908 | Strange | ...................... | B60P 3/41 414/460 |
| 2,399,304 A * | 4/1946 | Watkins | ..................... | B60P 3/41 414/460 |
| 2,433,822 A * | 12/1947 | Bartholomew | ........... | B60P 3/41 414/460 |
| 2,612,279 A * | 9/1952 | Lovel | ........................ | B60P 3/41 280/14.28 |
| 4,221,525 A * | 9/1980 | Stedman | .................... | B60P 3/41 414/731 |
| 4,436,475 A * | 3/1984 | Blagg | .................. | A01G 23/006 414/569 |
| 5,876,174 A * | 3/1999 | Arsenault | ................. | B60P 3/41 414/23 |
| 6,921,241 B2 * | 7/2005 | Rogers | ................. | A01G 23/003 414/920 |
| 9,131,647 B1 * | 9/2015 | Lindberg | ................ | B66C 1/585 |
| 2013/0251486 A1 * | 9/2013 | Pollard, Sr. | ............... | B60P 3/41 414/460 |

OTHER PUBLICATIONS

Screen captures of Second Life Design, "The Best Log Trailer on the Planet! How I load big logs", 283 pages, downloaded from URL https://www.youtube.com/watch?v=Ckh6VHfzP_0 visited Dec. 13, 2022.

Screen captures of Log Trailer, "Firewood Log Trailer", 7 pages, downloaded from URL https://www.youtube.com/watch?v=Nli3C6sh5XA visited Dec. 13, 2022.

Screen captures of April Wilson, "Building a Log Hauling Trailer", 8 pages, downloaded from URL https://www.youtube.com/watch?v=ul6kC2YN1Oc visited Dec. 13, 2022.

* cited by examiner

*Primary Examiner* — Mark C Hageman
(74) *Attorney, Agent, or Firm* — Hooker & Habib, P.C.

(57) ABSTRACT

A log lift transporter for transporting logs held off the ground to a remote location includes a frame having a vertical front beam, a horizontal top beam extending from the top of the front beam to a back frame subassembly, the frame subassembly including a pair of spaced-apart vertical back beams. A choke is attached to the front beam that positions the front end of a log with respect to the frame.

11 Claims, 5 Drawing Sheets

LOG LIFT TRANSPORTER

RELATED APPLICATION

This application claims priority to and the benefit of U.S. Provisional Patent Application Ser. No. 63/289,220 "Log Lift Transporter" filed Dec. 14, 2021 and on the filing date of this patent application, which priority application is incorporated by reference as if fully set forth herein.

FIELD OF THE DISCLOSURE

The disclosure relates generally to apparatuses for transporting logs.

BACKGROUND OF THE DISCLOSURE

A log is transported from where a tree is cut down to a saw mill for cutting the logs into lumber. It is desirable that the log be transported without being dragged along the ground or otherwise touching the ground to prevent dirt and other contaminants from building up on the log prior to cutting.

SUMMARY OF THE DISCLOSURE

Disclosed is a wheeled log transporter that can be pulled behind a vehicle to transport a log to a sawmill or other destination while maintaining the log off the ground during transport.

Embodiments of a log lift transporter in accordance with this disclosure include a frame for supporting the log off the ground during transport. The frame includes a front beam extending axially vertically from a lower end to an opposite upper end, a top beam extending axially horizontally along a longitudinal axis from a front end to an opposite back end, the front end of the horizontal beam attached to the upper end of the front vertical beam, and a back frame subassembly arranged to support the back end of the horizontal beam. The back frame subassembly includes a pair of spaced apart back beams, each back beam extending axially vertically from a lower end to an opposite upper end, the pair of back beams being spaced apart from one another in a direction perpendicular to the top beam axis.

A hitch assembly is attached to the front beam and is configured for attaching the log lift transporter to a tow vehicle. The lower end of the front beam is spaced off the ground when the hitch assembly is attached to the tow vehicle.

Wheels support the frame for rolling movement along the ground parallel to the longitudinal axis.

A choke is attached to the front beam and is disposed between the front beam and the back frame subassembly. The choke includes a downwardly facing surface spaced vertically above the lower end of the front beam.

The front beam, the choke, and the pair of back beams define an empty volume to receive a log on the ground into the log lift transporter. The volume extends parallel with the longitudinal axis of the top beam from the front beam and extends beyond the pair of back beams.

A winch is supported on the frame and a winch cable is coupled to the winch, the winch cable capable of extending at least partially around log received into the log lift transporter to lift the log using the winch.

The disclosed log lift transporter has a number of advantages. The choke enables the log to be transported off the ground, and enables an end of the log to be secured to the choke and therefore to the frame during transport. The log can be lifted off the ground using the winch with the weight of the log urging the back end of the log against the ground while the front end of the log is being lifted off the ground to engage the choke. The log therefore does not swing freely while initially being lifted. The log engages the choke while the back end of the log is being lifted off the ground, the choke assisting in maintaining control of the log while the entire log is off the ground and before the log can be secured to the frame by one or more chains.

Other objects and features of a wheeled log lift transporter in according with this disclosure will become apparent as the description proceeds, especially when taken in conjunction with the accompanying drawing sheets illustrating one or more illustrative embodiments.

DETAILED DESCRIPTION

Figure 1:
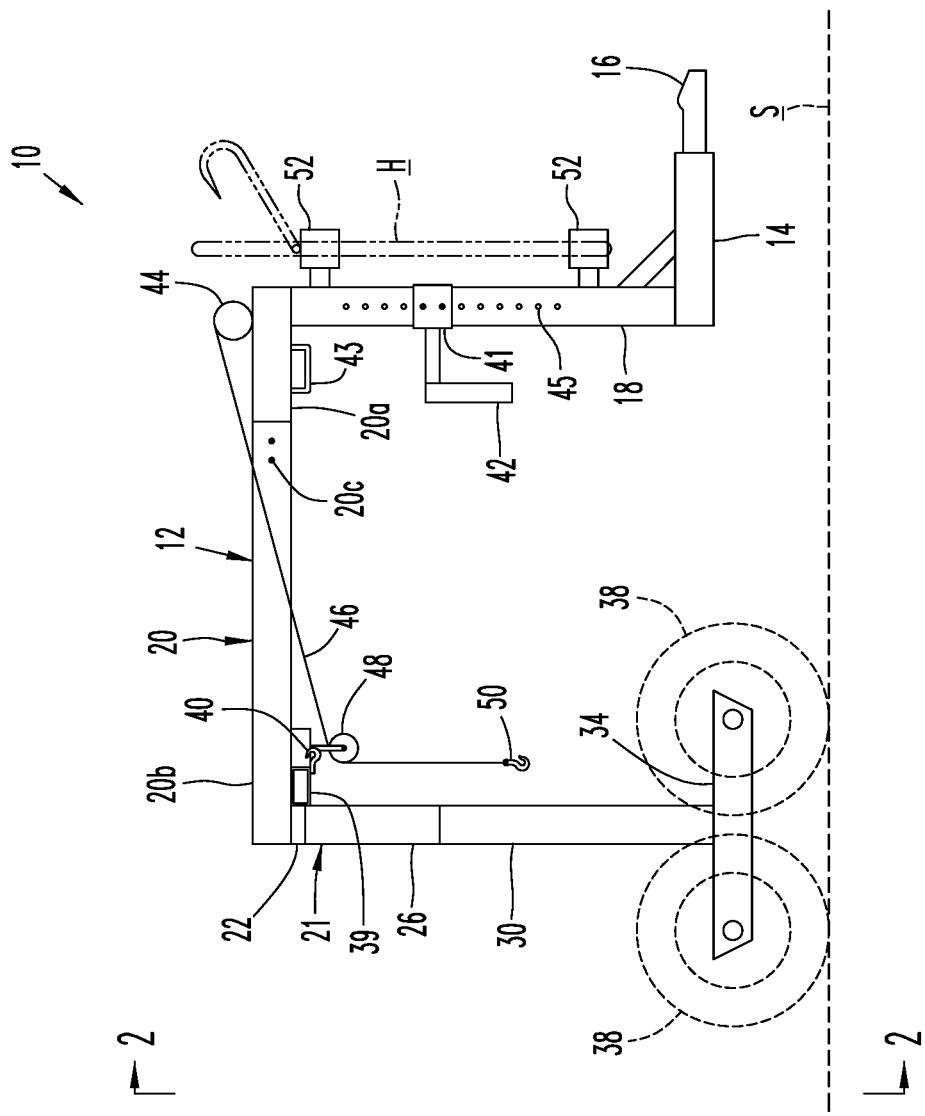
FIG. 1 is a right side view of a wheeled log lift transporter in accordance with this disclosure.
Figure 2:
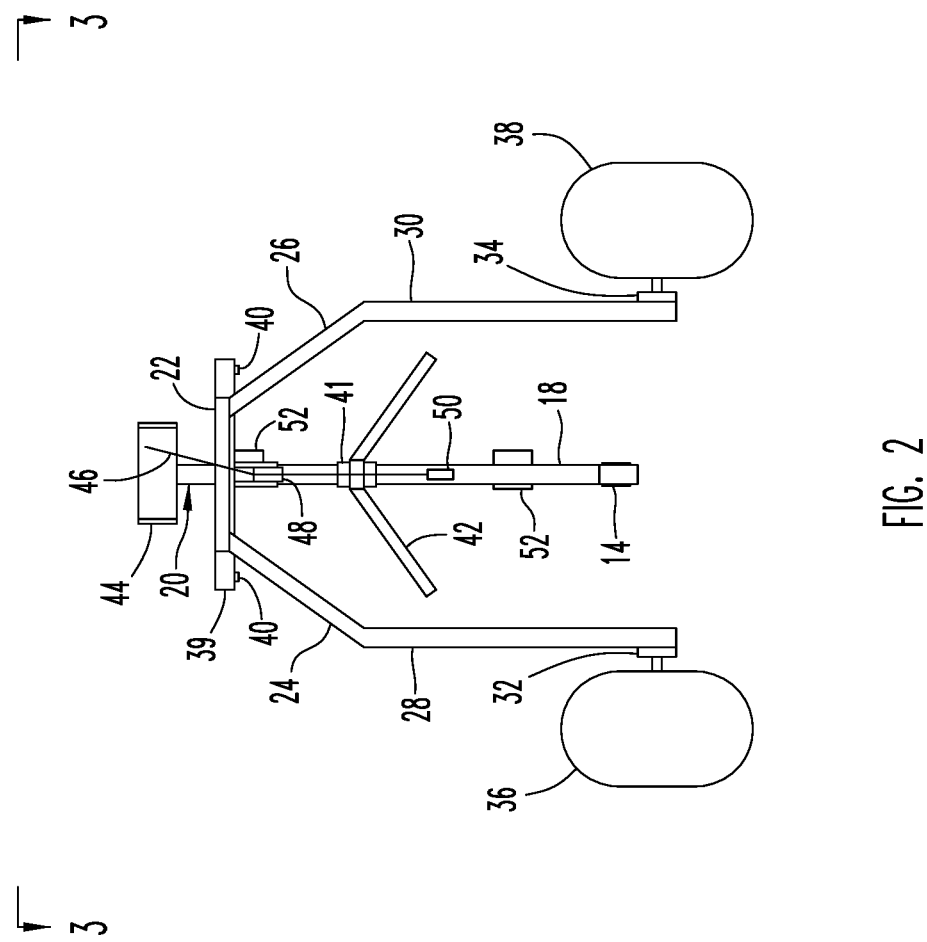
FIG. 2 is a back view of the wheeled log lift transporter taken along line 2-2 of FIG. 1.
Figure 3:
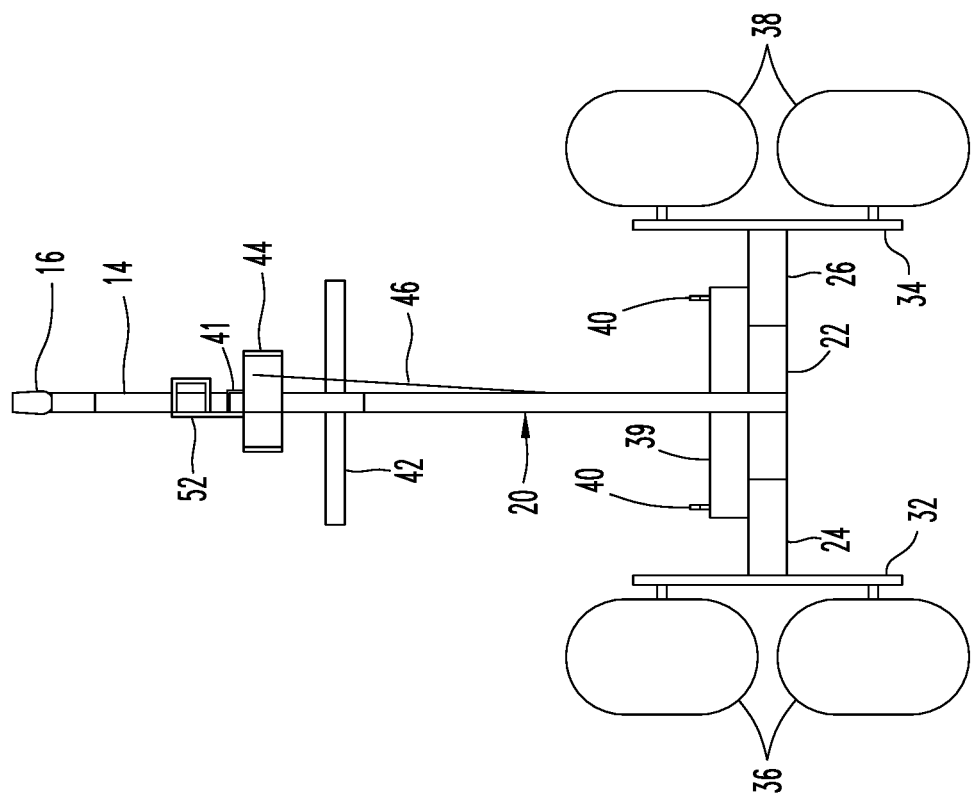
FIG. 3 is a top view of the wheeled log lift transporter taken along lines 3-3 of FIG. 1.

FIGS. 1-3 are right side, back, and top views respectively of an embodiment of a log lift transporter 10 in accordance with this disclosure. FIGS. 1-3 illustrate the log lift transporter 10 on a level surface represented by the dashed line S.

The log lift transporter 10 is intended to be used with a tow vehicle such as a pickup truck, SUV, all-terrain vehicle, or the like to transport a log to a remote destination.

The log lift transporter 10 includes a frame 12 and a hitch assembly consisting of a straight tongue 14 and a trailer coupler 16 extending from the free end of the tongue that attaches the transporter to the tow vehicle. In the illustrated embodiment the trailer coupler is sized to receive and connect to a 2 inch diameter ball. Safety chains (not shown) may also be attached between the coupler and the tow vehicle during transport of a log by the log lift transporter 10.

The frame 12 includes a vertical front post or beam 18, a horizontal top beam 20, and a back frame sub-assembly 21. The front beam is located at the front end of the log lift transporter 10 and extends upwardly from the tongue 14. The front beam extends to the horizontal, longitudinally extending top beam 20 attached to the upper end of the vertical beam 18. The top beam 20 extends rearwardly away from the vertical post 18 to the back frame sub-assembly 21.

The illustrated top beam 20 is made of a pair of telescoping front and back channel members 20a, 20b respectively that form an adjustable length member. Front channel member 20a is attached to the front beam 18. Rear channel member 20b is attached to the back frame sub-assembly 21. Cooperating sets of holes 200 in the channel members spaced along the length of the channel members receive bolts or shafts to fix the length of top beam 20 (only two of the holes 20c are shown in the drawings). A user can selectively set the distance from the front beam 18 to the back frame sub-assembly 21 by changing the length of the top beam 20 to accommodate different lengths of logs as described later below.

The frame sub-assembly 21 includes a horizontal cross beam 22 that supports the back end of the top beam 20. Extending downwardly and away from respective ends of the cross beam 22 are inclined side arms or side beams 24, 26 that extend to respective back vertical posts or beams 28, 30. The back beams are spaced apart from one another in the horizontal direction perpendicular to the longitudinal axis of the top beam 20.

Attached to the lower ends of the back beams 28, 30 are respective axle plates 32, 34, each axle plate rotatably mounting a pair of wheels 36, 38. Each pair of wheels are longitudinally side-by-side as shown in the figures. Tires are mounted on the wheels. The wheel assemblies are drawn in hidden lines and treated as if transparent for drawing purposes to not obstruct details of the axle plates. The wheels support the back frame subassembly for rolling movement along the ground parallel to the longitudinal axis.

In other embodiments of the disclosed log lift transporter, a single pair of wheels or additional pairs of wheels are attached to the axle plates. If a single pair of wheels is provided, the axle plates can be eliminated and the wheels attached directly to the back beams 28, 30. A log lift transporter having a single pair of wheels may have the front of the transporter resting on the ground when the transporter is not attached to a tow vehicle. Suspension components such as shocks and springs may also be provided, but for off-road use at relatively low speeds it has been found that a suspension is not required.

Attached to respective ends of a second cross beam 39 attached to the bottom of the back channel member 20b is a pair of heavy-duty chain hooks 40 that extend towards the front end of the frame 12 to expose the throats of the chain hooks. The chain hooks are located on opposite sides of the top beam 20 and support respective ends of a chain that will support the log on the transporter 10. The ends of the chain can be attached directly to the chain hooks or can be attached indirectly to the chain hooks by "S" hooks or the like.

The general shape of a chain hook 40 is similar to the winch hook 50 also shown in FIG. 1. In other embodiments of the cross beam 39, the cross beam 39 can contain slots, grooves, or like structure to receive and hold the ends of the chain, or could mount other structures that can directly or indirectly attach the ends of the chain.

Attached to the front beam 18 by a tubular sleeve 41 is a choke 42 disposed below the horizontal top beam 20. The choke is formed as a relatively shallow "V"-shape member formed from two metal straps or flat plates extending downwardly and away from each other. The sleeve 41 includes an elongate axial post that spaces the choke 42 away from the front beam 18 and towards the back frame sub-assembly 21. The front beam 18 has vertically spaced apart holes 45 that cooperate with holes in the sleeve that enable the sleeve to selectively re-position and fixedly attach the choke at different fixed vertical positions along the front beam 18.

The choke 42 has downwardly facing surfaces spaced vertically above the lower end of the front beam 18. The choke surfaces engage a log transported by the log lift transporter 10 and assists in positioning and securing the log to the log lift transporter as will be discussed in more detail below.

Attached to the bottom side of the top beam channel member 20a adjacent the front beam 18 is a channel-defining member or channel member 43 that forms part of the frame 12. The channel member 43 defines a through-channel that receives a strap that will securely strap the front portion of the log against the choke and to the frame.

Mounted on the top of the top beam front channel member 20a near the forward end of the frame 12 is an electric winch 44 that retracts and extends a winch cable 46. Wires (not shown) extend from the winch 44 and are removably connected to an electrical power source such as a battery to provide power to the electric winch 44. A manual winch can be used instead of the electric winch if desired.

The winch cable 46 extends over a swivel pulley 48 mounted to the bottom side of the top beam back channel member 20b adjacent the chain support cross beam 39 and to a winch hook 50 attached to the free end of the winch cable. Cable guide structure (for example, rollers) can be provided to guide and define the path of the winch cable from the winch 44 to the pulley.

The winch 44 raises the log off the ground for transport by the transport 10 and lowers the log back to the ground after transport. The winch and winch strap are preferably not relied on solely, however, for securing the log to the log lift transporter 10 during log transport.

Disposed on a side of the front beam 18 are a pair of spaced-apart tool brackets 52. The illustrated tool brackets 55 are configured to cooperatively hold and carry a cant hook H (shown in phantom lines in FIG. 1). The cant hook is used to roll a log into a desired position before transport or after transport. The tool brackets or additional provided tool brackets can be configured to hold and retain other types of tools, jacks, and the like if desired.

The top beam 20 is shown in its minimum-length configuration in FIGS. 1-3. In this configuration, the log lift transporter 10 is used to transport logs of eight-and-one-half foot length (a typical log length for producing eight foot lengths of lumber). The top beam 20 can be made longer to space the frame back sub-assembly 21 further from the front beam 18 for hauling longer logs, for example, ten-foot or twelve-foot long logs.

Attaching an eight-and-one-half foot log to the log lift transporter 10 for transport to a remote destination is discussed next with respect to FIGS. 4 and 5. During normal operation of the log lift transporter 10 in lifting and transporting logs the top beam channel members 20a, 20b define a fixed length top beam 20, the frame 12 being a rigid frame 12. The trailer coupler 16 of the log lift transporter 10 is attached to the tow vehicle. The tow vehicle assists in supporting the front side of the log lift transporter off the ground.

Figure 4:
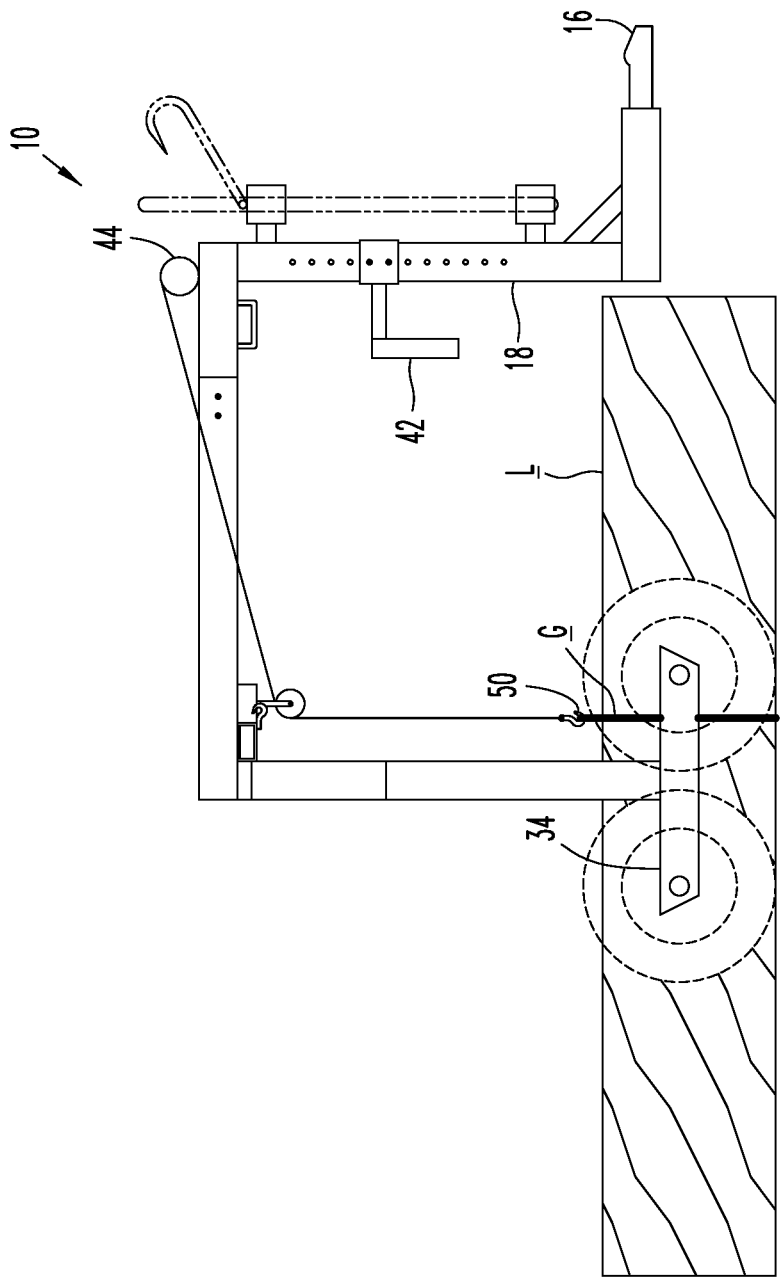
FIG. 4 is similar to FIG. 1 but illustrates the wheeled log list transporter chained to a log that will be transported by the wheeled log transporter.
Figure 5:
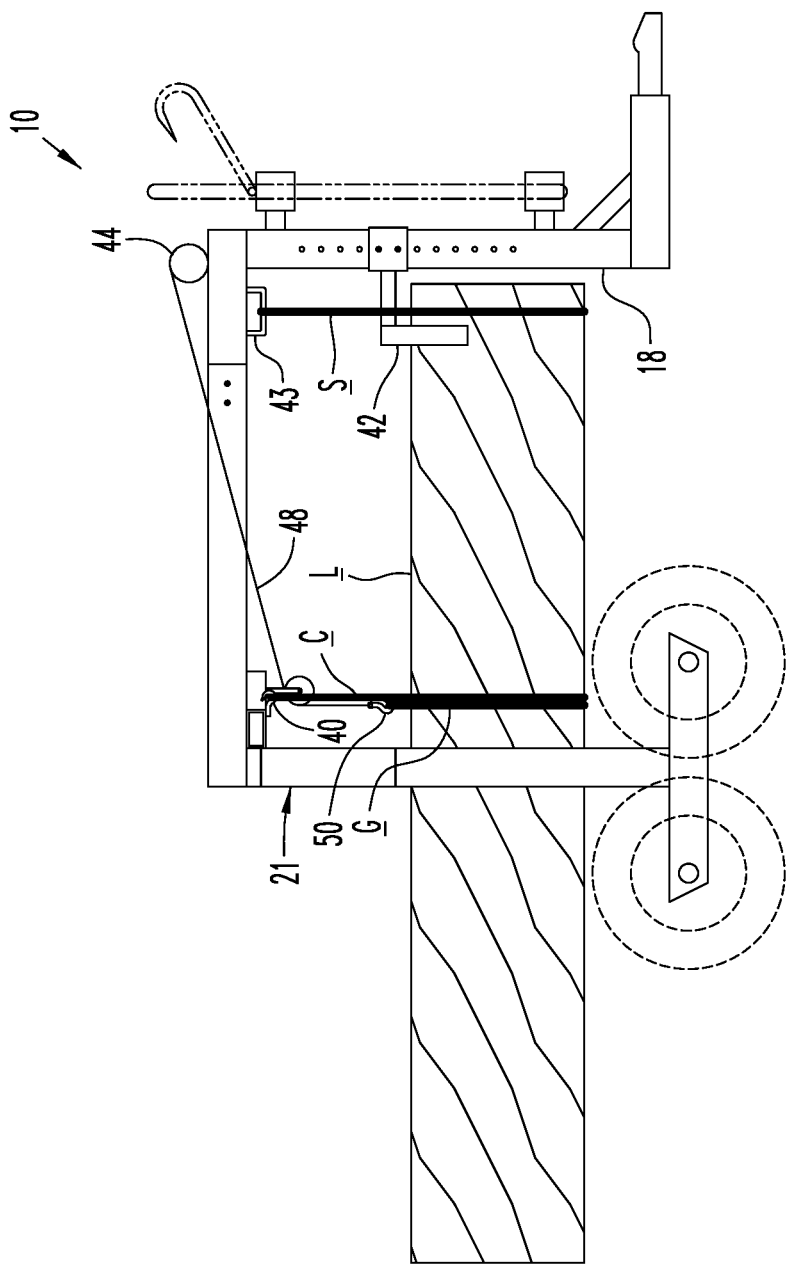
FIG. 5 is similar to FIG. 4 but illustrates the log lifted off the ground and supported for transport by the wheeled log lift transporter.

An eight-and-one-half foot long log L has been previously cut to length and is resting on the ground as shown in FIG. 4 (to simplify the drawings, the tow vehicle is not shown in FIGS. 4 and 5). The log extends axially on the ground along its length from a forward end to a back end.

The log lift transporter 10 with the winch hook 50 at or near its raised position for clearance over the log L is backed up parallel with the length of the log and receives the log between the back beams 28, 30 to place the forward end of the log adjacent to and closely spaced from the frame front beam 18. The log is now located directly underneath the choke 42 and the winch hook 50. The winch hook is axially closer to the front end of the log adjacent the front beam 18 than to the opposite back end of the log.

A ground chain G is placed under the log L vertically beneath the winch hook 50. The ground chain extends perpendicularly to the length of the log and has opposite ends on opposite sides of the log. The ground chain has sufficient length for the ends of the ground chain to attach to the winch hook 50. The ground chain is located forward of the log's center of gravity such that the weight of the log urges the log to pivot and raise the forward end of the log upwardly when the ground chain is raised off the ground as described below.

The winch hook 50 is lowered close to the log L and the free end portions of the ground chain are attached to the winch hook. The end portions of the ground chain can be attached directly to the winch hook or can be attached indirectly to the winch hook by an "S" hook or the like as is known in the log lifting art. FIG. 4 illustrates as a non-limiting example the winch hook 50 attached to the end links of the ground chain G.

The winch hook 50 is raised by the winch 44. The weight of the log L initially urges the back end of the log against the ground and raises the forward end of the log. The winch hook is raised until the forward end of the log is received into and abuts against the choke 42, preventing further upward movement of the forward end of the log.

Continued raising of the log L using the winch 44 now raises the back end of the log off the ground. The weight of the log continues to urge the front end of the log against the choke 42. The log is lifted until the entire log is lifted off the ground and there is adequate ground clearance between the log and the ground for transport. The log may, for example, in its raised position for transport may slope downwardly from the front end of the log or may be raised until the log is essentially parallel with the ground as shown in FIG. 5.

FIG. 5 illustrates the log L ready for transport by the log lift transporter 10. A heavy duty chain C is placed around the log and the end links of the heavy duty chain are supported on the pair of chain hooks 40. The chain hooks 40 are also located along the top beam 20 to be axially forward of the center of gravity of the log. The length of the heavy duty chain is preferably such that there is a slack of one or two chain links when the heavy duty chain is attached to the chain hooks.

The winch hook 50 is then lowered to have the log supported by the heavy duty chain and to remove the load from the winch hook, winch chain 48, and the winch 44. The log load taken by the winch is transferred to the heavy duty chain C, and from the heavy duty chain to the chain hooks 40 and the frame subassembly 21. The ground chain G attached to the winch hook can remain attached to the winch hook for removing the log off the lift log transporter 10 at the destination.

The weight of the log L continues to urge the front end of the log against the choke 42 while the log is being supported by the heavy-duty chain C. The strap S of a ratchet strap is passed through the channel member 43 and about the front end of the log, and is tightened to secure the front end of the log against the choke. The log is now attached to the log lift transporter 10 and spaced off ground for transport by the log lift transporter 10. Maintaining the front end of the log against the choke helps maintain the log in a more stable position with respect to the log lift transporter during transport and reduces impact loads applied to the choke by the log when going over bumps and the like that may urge the tongue 14 to lift off the ball.

If the log diameter is large such that there would be insufficient ground clearance with the log against the choke, the choke can be re-positioned along the transporter front beam 18 further from the ground to provide adequate ground clearance. Conversely, the choke can be re-positioned and fixed to the front beam 18 closer to the ground for smaller diameter logs while still maintaining adequate ground clearance of the log during transport.

To remove the log L from the log lift transporter 10, the winch hook 50 is raised by the winch 44 to provide some slack in the heavy duty chain C, thereby enabling removal of the heavy duty chain from the chain hooks 40. The strap S is also removed from the front of the log. The winch lowers the log to the ground. The ground chain C is removed from the winch hook and the log lift transporter 10 moves forward to be away from the log.

For smaller tow vehicles such as an all-terrain vehicle, logs should be transported that a positive (downward) tongue weight is placed on the tow vehicle. For larger motor vehicles, such as pickup trucks, the tongue weight is not as critical for most work profiles (speed of transport, distance transported, and total weight towed by the tow vehicle).

The top beam 20 is placed in a longer-length configuration when used to tow longer logs so that the winch hook 50 and chain hooks 40 are positioned forward of the center of gravity of the log but is axially closer to the center of gravity of the longer log than it would be in a shorter frame configuration. Placing the winch hook and chain hooks nearer the center of gravity of the log assures the proper tongue weight is applied to the tow vehicle. Conversely, the top beam 20 may need to be placed in a shorter-length configuration when used to tow shorter logs to assure the proper tongue weight is applied to the vehicle.

A chain forming a ground chain G or a heavy-duty chain C can be made of chain links, chain rollers, or any other construction or material having the requisite strength, flexibility, and durability to function safely to support the log during lifting of the log and during transport. The same type of chain may be used for the ground chain and heavy-duty chain.

While this disclosure includes one or more illustrative embodiments described in detail, it is understood that the one or more embodiments are each capable of modification and that the scope of this disclosure is not limited to the precise details set forth herein but include such modifications that would be obvious to a person of ordinary skill in the relevant art including (but not limited to) changes in material selection, size and dimensions, operating ranges, environment of use, fixed length or adjustable length top beam, and the like, as well as such changes and alterations that fall within the purview of the disclosure and claims.

What is claimed is:

1. A log lift transporter for transporting a log to a remote location, the log lift transporter comprising:
    a frame arranged for supporting a log for transport, the frame comprising:
        a front beam extending axially vertically from a lower end to an opposite upper end;
        a top beam extending axially horizontally along a longitudinal axis from a front end to an opposite back end, the front end of the top beam attached to the upper end of the front beam;
        a back frame subassembly arranged to support the back end of the horizontal beam, the back frame subassembly comprising a pair of spaced apart back beams, each back beam extending axially vertically from a lower end to an opposite upper end, the pair of back beams spaced apart from one another in a direction perpendicular to the top beam axis; and
        a hitch assembly attached to the front beam and configured for attaching the log lift transporter to a vehicle;
    wheels supporting the back frame subassembly for rolling movement along the ground parallel to the longitudinal axis;

a choke attached to the front beam and disposed between the front beam and the back frame subassembly, the choke comprising a downwardly facing surface spaced vertically above the lower end of the front beam;

the front beam, the choke, and the pair of back beams defining a volume to receive a log on the ground into the log lift transporter that extends parallel with the longitudinal axis of the top beam from the front beam and beyond the pair of back beams; and a winch supported on the frame and a winch cable coupled to the winch, the winch cable capable of extending at least partially around a log received into the log lift transporter to lift the log using the winch;

wherein the frame defines a channel vertically aligned with the choke and above the choke, the channel being configured to receive a strap that can extend around the choke and an end of a log received against the choke to urge the log against the choke.

2. The log lift transporter of claim 1 wherein the choke is selectively positionable along at least a portion of the front beam to raise or lower the choke with respect to the ground.

3. The log lift transporter of claim 1 wherein the choke is a "V" shaped member comprising a pair of members extending downwardly and away from one another.

4. The log lift transporter of claim 1 wherein the frame comprises a cross beam adjacent to the back frame subassembly, the cross beam extending between opposite ends disposed on opposite sides of the horizontal beam, the cross beam being configured to support the ends of a chain wrapped at least partially around a log received into the log lift transporter to support the log independently of the winch cable.

5. The log lift transporter of claim 4 wherein the cross beam is configured with a pair of hooks being disposed to support the ends of the chain, the pair of hooks being on opposite sides of the top beam.

6. The log lift transporter of claim 1 wherein the channel is defined by a member of the frame attached to the top beam.

7. The log lift transporter of claim 1 wherein the horizontal beam is an adjustable-length member.

8. The log lift transporter of claim 1 comprising at least one tool holder attached to the frame.

9. The log lift transporter of claim 8 wherein the at least one tool holder comprises a pair of cant hook brackets attached to the front beam.

10. The log lift transporter of claim 1 wherein the frame hitch assembly comprises a tongue extending from the front beam and a trailer coupler attached to the tongue.

11. The log lift transporter of claim 1 comprising a pulley attached to the frame, the winch cable supported on the pulley.

* * * * *